United States Patent
Park et al.

(10) Patent No.: US 12,117,592 B2
(45) Date of Patent: Oct. 15, 2024

(54) COVER WINDOW FOR FLEXIBLE DISPLAY DEVICE AND FLEXIBLE DISPLAY DEVICE

(71) Applicant: LG CHEM, LTD., Seoul (KR)

(72) Inventors: Jin Young Park, Daejeon (KR); Yongjoon Heo, Daejeon (KR); Yeongrae Chang, Daejeon (KR)

(73) Assignee: LG CHEM, LTD., Seoul (KR)

(*) Notice: Subject to any disclaimer, the term of this patent is extended or adjusted under 35 U.S.C. 154(b) by 758 days.

(21) Appl. No.: 17/269,956

(22) PCT Filed: May 15, 2020

(86) PCT No.: PCT/KR2020/006416
§ 371 (c)(1),
(2) Date: Feb. 19, 2021

(87) PCT Pub. No.: WO2020/235877
PCT Pub. Date: Nov. 26, 2020

(65) Prior Publication Data
US 2021/0199856 A1      Jul. 1, 2021

(30) Foreign Application Priority Data

May 20, 2019   (KR) .................. 10-2019-0059000
May 14, 2020   (KR) .................. 10-2020-0057914

(51) Int. Cl.
*G02B 1/14*      (2015.01)
*B32B 27/28*     (2006.01)
(Continued)

(52) U.S. Cl.
CPC ............. *G02B 1/14* (2015.01); *B32B 27/281* (2013.01); *B32B 27/308* (2013.01); *B32B 27/34* (2013.01);
(Continued)

(58) Field of Classification Search
CPC ....... G02B 1/14; B32B 27/281; B32B 27/308; B32B 27/34; B32B 2250/24;
(Continued)

(56) References Cited

U.S. PATENT DOCUMENTS 5,607,763 A    3/1997   Matsuda
6,489,015 B1   12/2002  Tsuchiya et al.
(Continued)

FOREIGN PATENT DOCUMENTS

CN    104755539 A    7/2015
CN    105899977 A    8/2016
(Continued)

OTHER PUBLICATIONS

International Search Report issued for International Application No. PCT/KR2020/006416 on Aug. 27, 2020, 4 pages.

*Primary Examiner* — John D Freeman
(74) *Attorney, Agent, or Firm* — ROTHWELL, FIGG, ERNST & MANBECK, P.C.

(57) ABSTRACT

The present disclosure provides a cover window for a flexible display device comprising a laminate including a light-transmitting substrate or polymer substrate; and a first hard coating layer and a second hard coating layer each formed on both surfaces of the light-transmitting substrate or the polymer substrate, wherein a ratio of a modulus of the first hard coating layer to the total modulus of the laminate is 1.5 to 2.0, and wherein a surface pencil hardness measured from the first hard coating layer side is 5H or more based on 750 g, and a flexible display device comprising the cover window.

12 Claims, 1 Drawing Sheet

(51) Int. Cl.
*B32B 27/30* (2006.01)
*B32B 27/34* (2006.01)
*G02F 1/1333* (2006.01)

(52) U.S. Cl.
CPC ....... *B32B 2250/24* (2013.01); *B32B 2250/40* (2013.01); *B32B 2255/10* (2013.01); *B32B 2255/26* (2013.01); *B32B 2255/28* (2013.01); *B32B 2307/412* (2013.01); *B32B 2307/51* (2013.01); *B32B 2307/536* (2013.01); *B32B 2457/20* (2013.01); *G02F 1/133305* (2013.01)

(58) Field of Classification Search
CPC ............ B32B 2250/40; B32B 2255/10; B32B 2255/26; B32B 2255/28; B32B 2307/412; B32B 2307/536; B32B 2457/20; B32B 27/08; B32B 7/023; B32B 27/20; G02F 1/133305; G02F 1/133331; G02F 1/133723; C08J 2379/08; C08J 2433/06; C08J 2475/16; C08J 7/042; C08J 7/046; G09F 9/301
See application file for complete search history.

(56) References Cited

U.S. PATENT DOCUMENTS

| | | | |
|---|---|---|---|
| 9,403,991 | B2 | 8/2016 | Kang et al. |
| 9,567,479 | B2 | 2/2017 | Kang et al. |
| 9,701,862 | B2 | 7/2017 | Kang et al. |
| 9,778,398 | B2 | 10/2017 | Kang et al. |
| 9,783,698 | B2 | 10/2017 | Kang et al. |
| 9,884,977 | B2 | 2/2018 | Kang et al. |
| 9,896,597 | B2 | 2/2018 | Kang et al. |
| 9,902,868 | B2 | 2/2018 | Kang et al. |
| 9,909,026 | B2 | 3/2018 | Kang et al. |
| 9,926,461 | B2 | 3/2018 | Kang et al. |
| 10,000,655 | B2 | 6/2018 | Kang et al. |
| 10,087,340 | B2 | 10/2018 | Kang et al. |
| 10,294,387 | B2 | 5/2019 | Kang et al. |
| 2015/0203711 | A1 | 7/2015 | Kang et al. |
| 2015/0363030 | A1* | 12/2015 | Nam ............... G06F 3/041 345/173 |
| 2016/0161800 | A1 | 6/2016 | Sekiguchi et al. |
| 2016/0259102 | A1 | 9/2016 | Taka |
| 2017/0036242 | A1 | 2/2017 | Lee et al. |
| 2017/0179424 | A1 | 6/2017 | Lee et al. |
| 2017/0313900 | A1 | 11/2017 | Lee |
| 2017/0364029 | A1 | 12/2017 | Cho et al. |
| 2018/0072914 | A1 | 3/2018 | Kim et al. |
| 2018/0088392 | A1 | 3/2018 | Park et al. |
| 2018/0196169 | A1 | 7/2018 | Choi et al. |
| 2018/0201002 | A1* | 7/2018 | Kim ............... B32B 27/08 |
| 2018/0215883 | A1 | 8/2018 | Park et al. |
| 2020/0010736 | A1 | 1/2020 | Lee et al. |
| 2020/0377735 | A1 | 12/2020 | Lim et al. |

FOREIGN PATENT DOCUMENTS

| | | |
|---|---|---|
| CN | 106443842 A | 2/2017 |
| CN | 107312369 A | 11/2017 |
| CN | 107544100 A | 1/2018 |
| CN | 107820503 A | 3/2018 |
| CN | 107849273 A | 3/2018 |
| CN | 107867030 A | 4/2018 |
| CN | 108299900 A | 7/2018 |
| JP | H06-287525 A | 10/1994 |
| JP | 2000-015734 A | 1/2000 |
| JP | 2000-214791 A | 8/2000 |
| JP | 2018-525248 A | 9/2018 |
| KR | 10-2014-0027027 A | 3/2014 |
| KR | 10-2017-0017734 A | 2/2017 |
| KR | 10-2017-0038731 A | 4/2017 |
| KR | 10-2017-0073948 A | 6/2017 |
| KR | 10-2017-0141851 A | 12/2017 |
| KR | 10-2018-0101463 A | 9/2018 |
| WO | 2015-037568 A1 | 3/2015 |
| WO | 2018-155819 A1 | 8/2018 |
| WO | 2019-066368 A1 | 4/2019 |

* cited by examiner

COVER WINDOW FOR FLEXIBLE DISPLAY DEVICE AND FLEXIBLE DISPLAY DEVICE

CROSS REFERENCE TO RELATED APPLICATION(S)

This application is a 35 U.S.C. 371 National Phase Entry Application from PCT/KR2020/006416, filed on May 15, 2020, designating the United States, which claims priority based on Korean Patent Application Nos. 10-2019-0059000 filed on May 20, 2019 and 10-2020-0057914 filed on May 14, 2020, the disclosures of which are incorporated herein by reference in their entirety.

TECHNICAL FIELD

The present disclosure relates to a cover window for a flexible display device, and a flexible display device.

BACKGROUND OF THE INVENTION

Recently, with the development of mobile devices such as smartphones and tablet PC, thinning and slimming of substrates for display are required. Glass or tempered glass is commonly used as a material having excellent mechanical properties on windows or front boards for displays of mobile devices. However, the glass causes the weight increase of the mobile devices due to its own weight, and has a problem of breakage due to an external impact.

Accordingly, the research for plastic resin is actively underway as a material which can replace the glass. A plastic resin film is lightweight and less fragile, and thus is suitable for the trend of pursuing lighter mobile devices. In particular, in order to implement a film having high hardness and abrasion resistance properties, films for coating a hard coating layer made of plastic resins onto a support substrate have been proposed.

As a method of increasing the surface hardness of the hard coating layer, a method of increasing the thickness of the hard coating layer may be considered. In order to ensure the surface hardness enough to replace the glass, it is necessary to implement a certain thickness of a hard coating layer. However, as the thickness of the hard coating layer is increased, the surface hardness may be increased but the occurrence of wrinkles and curls are increased due to curing shrinkage of the hard coating layer, and at the same time cracking and peeling of the coating layer are likely to occur. Therefore, the practical application of this method is not easy.

Meanwhile, a display in which a part of the display device is bent or flexibly warped for aesthetic and functional reasons has recently been attracting attention, and this tendency is noticeable particularly in mobile devices such as smartphones and tablet PCs. However, since glass is not suitable for use as a cover plate for protecting such a flexible display, it needs to be replaced with a plastic resin or the like. However, for that purpose, it is not easy to produce a thin film having sufficient flexibility while exhibiting a glass level of high hardness.

BRIEF DESCRIPTION OF THE INVENTION

The present disclosure provides a cover window for a flexible display device which exhibits high hardness while simultaneously satisfying the physical property balance between flexibility and high hardness, in particular, hardly has a risk of damaging the film even by repetitive bending or folding operations, and thus, can be easily applied to bendable, flexible, rollable or foldable mobile devices, display devices, and the like.

The present disclosure provides a flexible display device including the above-mentioned cover window for a flexible display device.

In one aspect, there is provided a cover window for a flexible display device including a laminate including a light-transmitting substrate or polymer substrate; and a first hard coating layer and a second hard coating layer each formed on both surfaces of the light-transmitting substrate or the polymer substrate, wherein a ratio of a modulus of the first hard coating layer to the total modulus of the laminate is 1.5 to 2.0, and wherein a surface pencil hardness measured from the first hard coating layer side is 5H or more based on 750 g.

In another aspect, there is provided a flexible display device including the cover window for the flexible display device.

DETAILED DESCRIPTION OF THE INVENTION

Hereinafter, a cover window for a flexible display device and a flexible display device according to a specific embodiment of the present disclosure will be described in more detail.

As used herein, the term "flexible" means a state having flexibility to such an extent that cracks of 3 mm or more in length do not occur when wound on a cylindrical mandrel with a diameter of 3 mm. Therefore, the flexible plastic film of the present disclosure can be applied to a cover film of a bendable, flexible, rollable, or foldable display or the like.

As used herein, the (meth)acrylate is meant to include both acrylate or methacrylate.

The light-transmitting substrate may have a transmittance of 50% or more, or a transmittance of 50% to 99.9% at a wavelength of 300 nm or more, or at a wavelength of 400 nm to 800 nm.

In accordance with one embodiment of the present disclosure, there can be provided a cover window for a flexible display device including a laminate including a light-transmitting substrate or polymer substrate; and a first hard coating layer and a second hard coating layer each formed on both surfaces of the light-transmitting substrate or the polymer substrate, wherein a ratio of a modulus of the first hard coating layer to the total modulus of the laminate is 1.5 to 2.0, and wherein a surface pencil hardness measured from the first hard coating layer side is 5H or more based on 750 g.

The present inventors have conducted research on an optical laminate applicable to a flexible display device having a thinner thickness, and have found that as the ratio of the modulus of the first hard coating layer to the total modulus of the laminated structure in which a predetermined first hard coating layer and a second hard coating layer are formed on both sides of the light-transmitting substrate is 1.5 to 2.0, it exhibits high hardness and also does not generate cracks when wound around a mandrel having a diameter of 3 mm, and thereby, it can be used as a cover window for a flexible display device, and completed the present disclosure.

And, the present inventors have found through experiments that the cover window for a flexible display device which exhibits high hardness while simultaneously satisfying the physical property balance between flexibility and high hardness, in particular, hardly has a risk of damaging the film even in repetitive bending or folding operations, and thus, can be easily applied to bendable, flexible, rollable or foldable mobile devices, display devices, and the like, and completed the present disclosure.

Since the cover window for a flexible display device may have physical properties that can replace tempered glass and the like, the optical laminate may have characteristics to a degree at which it may not be broken by pressure or force applied from the outside and also can be sufficiently warped and folded.

The total modulus of the laminate may be the result measured by applying a strain rate of 12.5 mm/min according to ISO 527-3. The total modulus of the laminate may be measured using a device such as Universal Testing System (Instron® 3360).

The modulus of the first hard coating layer may be the result of measuring at a strain rate of 0.05/s by applying a target load of 45 mN according to ISO 14577-1 and applying a target depth of 400 μm from the first hard coating layer side. The modulus of the first hard coating layer can be measured using a device such as Nano Indentation (MTS Nanoindenter XP).

As described above, the physical properties such as bending durability and surface hardness of the cover window for the flexible display device are attributable to specifying the ratio of the modulus of the first hard coating layer to the laminate including a light-transmitting substrate or polymer substrate, and a first hard coating layer and a second hard coating layer.

And, the ratio of the modulus of the first hard coating layer to that of the laminate may be attributable to components included in the light-transmitting substrate or polymer substrate, the first hard coating layer, and the second hard coating layer, and to the adjustment of the components and the physical properties associated therewith.

In addition, the first hard coating layer and the second hard coating layer having different properties may be formed on both surfaces of the light-transmitting substrate or the polymer substrate included in the cover window for the flexible display device, respectively, whereby the cover window for the flexible display device can have excellent curls and excellent bending durability while maintaining high hardness.

Further, according to such a structure, it is possible to satisfy the physical property balance between flexibility and high hardness at the same time, and to prevent damage to the internal structure even by repetitive bending or folding operations, and additionally, it can have optical properties such as high transparency along with excellent mechanical properties and heat resistance.

More specifically, the ratio of the modulus of the first hard coating layer to the total modulus of the laminate may be 1.5 to 2.0, or 1.750 to 1.950, or 1.700 to 1.900.

As the ratio of the modulus of the first hard coating layer to the total modulus of the laminate satisfies the above range, the cover window for the flexible display device exhibits high hardness as well as sufficient flexibility while exhibiting high hardness comparable to that of glass. In particular, the film is hardly damaged even by repetitive bending or folding operations, and thus, can be easily applied to a bendable, flexible, rollable, or foldable mobile device, or a display device.

On the contrary, the ratio of the modulus of the first hard coating layer to the total modulus of the laminate is too low, the cover window for the flexible display device may have a certain degree of flexibility, but the surface hardness can be reduced.

If the ratio of the modulus of the first hard coating layer to the total modulus of the laminate is too high, it may not secure durability against repetitive bending or folding operations, or it may not secure flexibility or bending property enough to be applied to flexible display devices.

Meanwhile, the range of the modulus of each of the laminate and the first hard coating layer is not particularly limited, but in order for the cover window for the flexible display device of the embodiment to have the above-described effects, the total modulus of the laminate may be 5.5 to 6.5 GPa, or 5.7 to 6.3 GPa, and the modulus of the first hard coating layer may be 10.0 to 12.0 GPa, or 10.5 to 11.8 GPa.

The light-transmitting substrate may have an elastic modulus of 5 GPa or more, or 5 to 10 GPa, as measured by applying a strain rate of 12.5 mm/min to a sample having a thickness of 50±2 μm, and thereby, can have excellent mechanical properties, high elasticity and folding endurance.

The kind of the light-transmitting substrate is not particularly limited as long as it satisfies the above-mentioned properties, but for example, a glass substrate may be used, or a polymer substrate including polyimide, polyamide, polyamideimide, or a mixture thereof, or a copolymer thereof may be used.

The cover window for the flexible display device simultaneously satisfies the physical property balance between flexibility and high hardness even in a thinner thickness range compared to other previously known optical laminates, can prevent damage to the internal structure even by repetitive bending or folding operations, and can have optical properties such as high transparency along with high mechanical properties and heat resistance. In addition, the ratio of the modulus of the first hard coating layer to the total modulus of the laminate may be related to the thickness of the light-transmitting substrate and the first and second hard coating layers.

More specifically, the light-transmitting substrate may have a thickness of 5 μm to 100 μm, a thickness of 10 μm to 80 μm, or a thickness of 20 μm to 60 μm. If the thickness of the substrate is less than 5 μm, during the process of forming the coating layer, there is a risk of breakage or curls, and it may be difficult to achieve high hardness. On the other hand, if the thickness exceeds 10 μm, the flexibility may be reduced and thus, it may be difficult to form a flexible film.

Each of the first and second hard coating layers may have a thickness of 1 μm to 20 μm, or 3 μm to 15 μm. When the thickness of the hard coating layer is excessively large, the flexibility of the cover window for the flexible display device or durability against repetitive bending or folding operations may be deteriorated.

On the other hand, the cover window for the flexible display device may have a surface pencil hardness of 5H or more based on 750 g, as measured from the first hard coating layer side, and may have a feature that cracks may not occur when a hard coating layer having a pencil hardness of 5H or more is applied together under a load of 750 g and wound around a mandrel having a diameter of 3 mm.

In addition, due to the structure of the cover window for the flexible display device described above, it has excellent durability against repetitive bending or folding operations applied under low temperature conditions, and is also excellent in durability against repetitive bending or folding operations under high temperature and high humidity conditions.

In addition, it is possible to prevent cracks from occurring in 100,000-time bending durability tests performed around a rod having a diameter of 5 mm at a temperature of 60° C. and 90 H % with respect to the cover window for the flexible display device.

Further, the cover window for the flexible display device has high durability against repetitive bending operations even at room temperature while having high surface hardness. Specifically, the cover window for the flexible display device may have a surface pencil hardness of 5H or more based on 750 g as measured from the first hard coating layer side, and cracks may not occur in 100,000-time bending durability tests performed around a rod having a diameter of 2 mm at a temperature of 25° C. for the cover window for the flexible display device.

Meanwhile, the cover window for the flexible display device according to the embodiment may have a light transmittance of 90.0% or more and a haze of 1.0% or less, or 0.7% or less, or 0.5% or less.

Meanwhile, in order to implement the above-mentioned properties, it is preferable that the cover window for the flexible display device includes a light-transmitting substrate that can simultaneously satisfy the physical property balance between flexibility and high hardness properties, and can prevent damage occurring to the internal structure even by repetitive bending or folding operations.

More specifically, the yellowness index of the light-transmitting substrate measured based on the standards of ASTM D1925 may be 4.5 or less or 3.8 or less, and the haze of the light-transmitting substrate measured based on ASTM D1003 may be 1.1% or less, or 0.4 to 0.8%, and thus may have colorless and transparent optical properties.

As described above, generally, the film or optical laminate having a thin thickness can secure flexibility, but it cannot easily secure durability against repeated bending or folding operations while securing high surface strength.

In contrast, the cover window for the flexible display device of the embodiment can have the above-mentioned properties by including a hard coating layer capable of securing durability against repeated bending or folding operations while having high hardness together with the light-transmitting substrate having the above-mentioned properties.

Specifically, the first hard coating layer may include a binder resin containing a cured product of a monomer mixture including a 6- or less functional (meth)acrylate compound, and a 8- or more functional (meth)acrylate compound, and fine inorganic particles dispersed in the binder resin.

In this case, the weight ratio of the 6- or less functional (meth)acrylate compound and the 8- or more functional (meth)acrylate compound may be 1:2 to 1:10, or 1:3 to 1:9.

The monomer mixture may be a polymer or copolymer of monomer(s) having other photocurable reactive groups, in addition to the 6- or less functional (meth)acrylate compound and the 8- or more functional (meth)acrylate compound. Specifically, it may further include a (meth)acrylate-based monomer or oligomer, a vinyl-based monomer or oligomer, or the like.

The 6- or less functional (meth)acrylate compound be a 1- to 6-functional acrylate-based monomer or oligomer, and the 1- to 6-functional acrylate-based monomer or oligomer may include trimethylolpropane triacrylate (TMPTA), trimethylolpropaneethoxy triacrylate (TMPEOTA), glycerin propoxylated triacrylate (GPTA), pentaerythritol tetraacrylate (PETA), dipentaerythritol hexaacrylate (DPHA), and the like. The 1- to 6-functional acrylate-based monomer or oligomer may be used alone or in combination of different types.

The (meth)acrylate-based monomer or oligomer, vinyl-based monomer or oligomer may have a weight average molecular weight (Mw) ranging from about 200 to about 2,000 g/mol, or from about 200 to about 1,000 g/mol, or about 200 to about 500 g/mol.

The 1- to 6-functional acrylate monomer may have an acrylate equivalent weight in the range of about 50 to about 300 g/mol, or about 50 to about 200 g/mol, or about 50 to about 150 g/mol.

The 8- or more functional (meth)acrylate compound may be a 8- to 20-functional urethane acrylate-based monomer or oligomer. The 8- to 20-functional acrylate-based monomer or oligomer is crosslinked and polymerized with the 1- to 6-functional acrylate monomer or oligomer to form a copolymer, and can impart high hardness, flexibility and impact resistance to the coating layer formed after curing. The 8- to 20-functional urethane acrylate-based monomer or oligomer may be used alone or in combination of different types.

As described above, the weight ratio of the 6- or less functional (meth)acrylate compound: the 8- or more functional (meth)acrylate compound may be 1:2 to 1:10, or 1:3 to 1:9. The cover window for the flexible display device can also secure durability against repeated bending or folding operations, while securing high flexibility and high surface strength even in a range of a relatively thin thickness.

The 8- or more functional (meth)acrylate compound may have a weight average molecular weight in the range of about 2,000 to about 8,000 g/mol, or about 3,000 to about 6,000 g/mol, or about 3,000 to about 5,000 g/mol, which may be desirable for the optimization of the physical properties of the coating layer.

The binder resin contained in the first hard coating layer may further include a copolymer formed from (meth)acrylic polymer having a weight average molecular weight of 10,000 to 200,000 and monomer mixture.

Meanwhile, the second hard coating layer may include a binder resin derived from a (meth)acrylate compound and fine inorganic particles dispersed in the binder resin. Further, the ratio of the modulus of the second hard coating layer to the total modulus of the laminate may be 1.400 to 1.800, or 1.450 to 1.775.

The ratio (R1) of the modulus of the first hard coating layer to the total modulus of the laminate may be 0.1000 or more larger than the ratio (R2) of the modulus of the second hard coating layer to the total modulus of the laminate, or can be as large as 0.1000 to 0.6000.

The modulus of the second hard coating layer may be the result of measuring at a strain rate of 0.05/s by applying a target load of 45 mN according to ISO 14577-1and applying a target depth of 400 μm from the first hard coating layer side.

That is, the second hard coating layer may include a binder resin of a different type from the binder resin contained in the first hard coating layer or a binder resin having a different structure and different properties, whereby the modulus ratio of the first and second hard coating layers to the total modulus of the laminate may vary within the above-described range.

Meanwhile, the binder resin contained in the first hard coating layer may further include a copolymer formed from (meth)acrylic polymer having a weight average molecular weight of 10,000 to 200,000 and monomer mixture.

That is, the binder resin contained in the first hard coating layer may include a monomer mixture including a 6- or less functional (meth)acrylate compound and an 8- or more functional (meth)acrylate compound, and a copolymer formed by reflecting together a (meth)acrylic polymer having a weight average molecular weight of 10,000 to 200,000.

The (meth)acrylic polymer having a weight average molecular weight of 10,000 to 200,000 may serve to impart toughness and flexibility of the coating layer.

More specifically, the binder resin contained in the first hard coating layer may include 40% by weight or less, or 5 to 40% by weight of a (meth)acrylic polymer having a weight average molecular weight of 10,000 to 200,000.

Further, the hard coating layer may include fine inorganic particles dispersed in the binder resin.

The inorganic particles may be, for example, metal atoms such as silica, aluminum, titanium, or zinc, or oxides or nitrides thereof, and the like, and each may be independently silica fine particles, aluminum oxide particles, titanium oxide particles, or zinc oxide particles or the like.

The fine inorganic particles may have an average radius of 100 nm or less, or 5 to 100 nm.

The hard coating layer may include two or more kinds of fine inorganic particles having an average radius different from that of the binder resin. In this case, the two or more kinds of inorganic particles may include first inorganic particles having an average radius of 20 to 35 nm, and second inorganic particles having an average radius of 40 to 130 nm.

The average radius of each of the first inorganic particles and the second inorganic particles can be confirmed through a commonly known method. For example, it may be calculated and derived by measuring the radius of individual particles identified in an electron micrograph (SEM, TEM, etc.) of the hard coating layer, or it may be an average radius of inorganic particles calculated through an X-ray scattering experiment.

Meanwhile, the content of the fine inorganic particles contained in each of the first and second hard coating layers is not particularly limited, but preferably, each of the first and second hard coating layers may contain 30 to 100 parts by weight, or 50 to 80 parts by weight of the fine inorganic particles relative to 100 parts by weight of the binder resin. That is, the first hard coating layer may contain 30 to 100 parts by weight of the fine inorganic particles relative to 100 parts by weight of the binder resin, and the second hard coating layer may contain 30 to 100 parts by weight of the fine inorganic particles relative to 100 parts by weight of the binder resin.

When the content of the fine inorganic particles contained in the hard coating layer is too small, the hardness of the hard coating layer may be lowered. Further, when the content of the fine inorganic particles contained in the hard coating layer is too high, the hardness may be increased, but the flexibility of the cover window may be greatly reduced, or durability against repeated bending or folding operations may also be reduced.

Meanwhile, the cover window for the flexible display device may be provided by applying the coating composition for forming the hard coating layer onto at least one surface of the light-transmitting substrate and photocuring the same.

The method of coating the coating composition is not particularly limited as long as it can be used in the technical field to which the present technology belongs, and for example, a bar coating method, a knife coating method, a roll coating method, a blade coating method, a die coating method, a micro gravure coating method, a comma coating method, a slot die coating method, a lip coating method, a solution casting method, or the like can be used.

At least one selected from a layer, a membrane, a film or the like such as a plastic resin film, a cohesive film, a release film, a conductive film, a conductive layer, a liquid crystal layer, a coating layer, a cured resin layer, a non-conductive film, a metal mesh layer or a patterned metal layer may be further included between the top surface of the hard coating layer or the substrate film and the coating layer.

For example, an antistatic layer having conductivity is first formed on a substrate, and then a coating layer is formed thereon to provide an anti-static function, or a low refractive index layer is introduced on the coating layer to implement a low reflection function.

Further, the layer, membrane, film or the like may be in any form of a single layer, a double layer, or a laminate type. The layer, membrane, film or the like may be formed by laminating a freestanding film with an adhesive, a cohesive film, or the like, or may be laminated on the coating layer by a method such as coating, vapor deposition, sputtering, or the like, but the present disclosure is not limited thereto.

Meanwhile, the hard coating layer may further include components commonly used in the art, such as a photoinitiator, an organic solvent, a surfactant, a UV absorber, a UV stabilizer, an anti-yellowing agent, a leveling agent, an antifouling agent, a dye for improving the color value, etc., in addition to the above-mentioned binder resin, inorganic fine particles and the like. Further, since the content thereof can be variously adjusted within the range that does not deteriorate the physical properties of the hard coating layer, it is not particularly limited. However, for example, they may be contained in an amount of about 0.01 to about 30 parts by weight based on about 100 parts by weight of the hard coating layer.

The surfactant may be a mono- or bi-functional fluorine-based acrylate, a fluorine-based surfactant, or a silicon-based surfactant. In this case, the surfactant may be included in a form of being dispersed or crosslinked in the crosslinked copolymer.

Further, the additive may include a UV absorber, or a UV stabilizer, and the UV absorber may include a benzophenone-based compound, a benzotriazole-based compound, a triazine-based compound or the like. The UV stabilizer may include tetramethyl piperidine or the like.

The photoinitiator may include 1-hydroxy-cyclohexyl-phenyl ketone, 2-hydroxy-2-methyl-1-phenyl-propanone, 2-hydroxy-1-[4-(2-hydroxyethoxy)phenyl]-2-methyl-1-propanone, methylbenzoylformate, α,α-dimethoxy-α-phenyl acetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, or bis(2,4,6-trimethylbenzoyl)-phenylphosphine oxide, and the like, but are not limited thereto. In addition, commercially available products include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators can be used alone or in combination of two or more.

The organic solvent may include alcohol based solvents such as methanol, ethanol, isopropyl alcohol and butanol; alkoxy alcohol based solvents such as 2-methoxyethanol, 2-ethoxyethanol and 1-methoxy-2-propanol; ketone based solvents such as acetone, methyl ethyl ketone, methyl isobutyl ketone, methyl propyl ketone and cyclohexanone; ether based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether and diethylene glycol-2-ethylhexyl ether; aromatic solvent such as benzene, toluene and xylene, and the like. These may be used alone or in combination.

Meanwhile, according to another embodiment of the invention, a flexible display device including the cover window for a flexible display device of the above-mentioned embodiment can be provided.

The flexible display device can be used as a curved, bendable, flexible, rollable or foldable-shaped mobile communication terminal, a touch panel of a smartphone or a tablet PC, and cover substrate or element substrate of various displays.

An example of the display device may be a flexible light emitting element display device.

For example, in the organic light emitting diode (OLED) display, a cover window including the polymer film may be positioned on an outer portion in a direction in which light or an image is emitted, and a cathode providing electrons, an electron transport layer, an emission layer, a hole transport layer, and an anode providing holes may be sequentially formed.

Further, the organic light emitting diode (OLED) display may further include a hole injection layer (HIL) and an electron injection layer (EIL).

In order to allow the organic light emitting diode (OLED) display to serve and act as a flexible display, in addition to using the polymer film as the cover window, a material having predetermined elasticity may be used in negative and positive electrodes and each of the constituent components.

Another example of the flexible display device may be a rollable display or foldable display device.

The rollable display may have various structures according to an application field, a specific shape, and the like. For example, the rollable display device may have a structure including a cover plastic window, a touch panel, a polarizing plate, a barrier film, a light emitting element (OLED element, or the like), a transparent substrate, or the like.

Advantageous Effects

According to the present disclosure, the cover window for a flexible display device and a flexible display device, which exhibit high hardness while simultaneously satisfying the physical property balance between flexibility and high hardness, in particular, hardly have a risk of damaging the film even in repetitive bending or folding operations, and thus, can be easily applied to bendable, flexible, rollable or foldable mobile devices, display devices, and the like, and the display device including the above-mentioned optical laminate, can be provided.

Since the cover window for a flexible display device may have physical properties that can replace tempered glass and the like, the optical laminate may have characteristics to a degree at which it may not be broken by pressure or force applied from the outside and also can be sufficiently warped and folded. Further, the optical laminate exhibits flexibility, bending property, high hardness, scratch resistance and high transparency, and hardly has a risk of damaging the film even in repetitive, continuous bending or long-time folding state. Therefore, the optical laminate can be usefully applied to bendable, flexible, rollable or foldable mobile devices, display devices, front boards and display unit of various instrument panels, and the like.

Hereinafter, the operation and effect of the invention will be described in more detail by way of concrete examples. However, these examples are merely presented for illustrative purposes only, and the scope of the invention is not determined thereby.

Preparation Example: Preparation of Coating Liquid for Forming Hard Coating Layer Preparation Example 1-1

20 g of trimethylolpropane triacrylate (TMPTA, manufactured by Cytec, Mw=296 g/mol, acrylate group equivalent=99 g/mol) as a trifunctional acrylate compound, 30 g of MU9800 (manufactured by Miwon, Mw=3500 g/mol, acrylate group equivalent=389 g/mol) as a 9-functional urethane acrylate compound, 50 g of MU9020 (manufactured by Miwon, Mw=4500 g/mol, acrylate group equivalent=450 g/mol) as a 10-functional urethane acrylate compound, 1 g of Irgacure 184 (manufactured by Ciba) as a photoinitiator, and 10 g of methyl ethyl ketone (MEK) were mixed to prepare an acrylate solution.

In the acrylate solution, 60 g of a solution in which 50% by weight of silica particles S1 (average particle diameter of 20 nm, surface-modified with methacrylate silane coupling agent) was dispersed in n-butyl acetate, and 100 g of a solution in which 30 wt % of silica particles S2 (average particle diameter of 40 nm, surface-modified with acrylate silane coupling agent) was dispersed in methyl ethyl ketone (MEK) were mixed to prepare a coating solution for forming a hard coating layer.

Preparation Example 1-2

20 g of trimethylolpropane triacrylate (TMPTA, manufacturer: Cytec, Mw=296 g/mol, acrylate group equivalent=99 g/mol) as a trifunctional acrylate compound, 30 g of MU9800 (manufactured by Miwon, Mw=3500 g/mol, acrylate group equivalent=389 g/mol) as a 9-functional urethane acrylate compound, 50 g of MU9020 (manufactured by Miwon, Mw=4500 g/mol, acrylate group equivalent=450 g/mol) as a 10-functional urethane acrylate compound, 40 g of a binder solution in which 50 wt % of SMP-250AP (Acrylic polymer, manufactured by Kyoeisha Chemical, acrylate group equivalent=240~260 g/mol, weight average molecular weight: 37,000) as an acrylate-based polymer compound was dissolved in propylene glycol monomethyl ether, 1 g of Irgacure 184 (manufactured by Ciba) as a photoinitiator, and 20 g of methyl ethyl ketone (MEK) were mixed to prepare an acrylate solution.

In the acrylate solution, 60 g of a solution in which 50 wt % of silica particles S1 (average particle diameter of 20 nm, surface-modified with methacrylate silane coupling agent) was dispersed in n-butyl acetate, and 100 g of a solution in which 30 wt % of silica particles S2 (average particle diameter of 40 nm, surface-modified with acrylate silane coupling agent) was dispersed in methyl ethyl ketone (MEK) were mixed to prepare a coating solution for forming a hard coating layer.

Preparation Examples 1-3 to 1-5

A coating solution for forming a hard coating layer was prepared in the same manner as in Preparation Example 1-1, except that the content of the ingredients used was adjusted as shown in Table 1 below.

Preparation Example 2-1

40 g of MU9800 (manufactured by Miwon, Mw=3500 g/mol, acrylate group equivalent=389 g/mol) as a 9-functional urethane acrylate compound, 40 g of MU9020 (manufactured by Miwon, Mw=4500 g/mol, acrylate group equivalent=450 g/mol) as a 10-functional urethane acrylate compound,), 20 g of PU340 (manufactured by Miwon, Mw=2400 g/mol, acrylate group equivalent=800 g/mol) as a trifunctional urethane acrylate compound, 1 g of Irgacure 184 (manufactured by Ciba) as a photoinitiator, and 10 g of methyl ethyl ketone (MEK) were mixed to prepare an acrylate solution.

In the acrylate solution, 60 g of a solution in which 50 wt % of silica particles S1 (average particle diameter of 20 nm, surface-modified with methacrylate silane coupling agent) was dispersed in n-butyl acetate, and 100 g of a solution in which 30 wt % of silica particles S2 (average particle diameter of 40 nm, surface-modified with acrylate silane coupling agent) was dispersed in methyl ethyl ketone (MEK) were mixed to prepare a coating solution for forming a hard coating layer.

Experimental Example: Measurement of Physical Properties of Cover Window for Flexible Display Device Experimental Example 1: Pencil Hardness For the hard coating layer formed in the front face of the optical laminate of each of Examples and Comparative Examples, the maximum hardness without scratches was confirmed after moving the pencil back and forth three times at an angle of 45 degrees under a load of 750 g using a pencil hardness tester in accordance with standard JIS K5400-5-4.

Experimental Example 2: Transmittance and Haze

The transmittance and haze were measured using a spectrophotometer (device name: COH-400) for each of the cover windows of Examples and Comparative Examples.

Experimental Example 3: Bending Test

According to the test method of JIS K5600-5-1, the cover window of each of Examples and Comparative Examples were wound around a cylindrical mandrel having various diameters, and then the minimum diameter at which no cracks occurred was measured.

TABLE 1

| | Manufacture, Product name | Preparation Example 1-1 | Preparation Example 1-2 | Preparation Example 1-3 | Preparation Example 1-4 | Preparation Example 1-5 | Preparation Example 2-1 |
|---|---|---|---|---|---|---|---|
| Acrylate compound/ polymer (unit: g) | TMPTA | 20 | 20 | 10 | 70 | | |
| | MU9800 | 30 | 30 | 30 | | 30 | 40 |
| | MU9020 | 50 | 30 | 40 | 30 | 30 | 40 |
| | SMP-250AP | | 20 | 20 | | 40 | |
| | PU340 | | | | | | 20 |
| Inorganic fine particles* (unit: g) | S1 | 30 | 30 | 30 | 30 | 30 | 30 |
| | S2 | 30 | 30 | 30 | 30 | 30 | 30 |
| Photoinitiator | Irgacure 184 | 1 | 1 | 1 | 1 | 1 | 1 |
| Organic solvent | MEK | 10 | 25.5 | 25.5 | 10 | 41.5 | 10 |

*In Table 1, the content of inorganic fine particles was shown by the net weight of only inorganic fine particles excluding the solvent according to the wt % of the inorganic fine particles dispersed in the solvent.

Examples and Comparative Examples: Cover Window for Flexible Display Device

A coating solution for forming a hard coating layer shown in Table 2 below was coated onto both surfaces of a 50 µm-thick polyimide substrate (elastic modulus based on a strain rate of 12.5 mm/min-listed in Table 2) by a bar coating method, and dried at 90° C. for 2 minutes under an air atmosphere. An optical laminate was manufactured by photocuring with a metal halide lamp (light quantity: 200 mJ/cm$^2$) having a wavelength of 290 to 320 nm. After the curing was completed, the thickness of the coating layers formed on both surfaces was 10 µm, respectively.

Experimental Example 4: Adhesive Strength of Coating Layer

The front surface of the hard coating layer formed in the front surface of the cover window of each of Examples and Comparative Examples was scratched using a cutter knife so that 100 grids were formed within the size of 1 cm*1 cm~2 cm*2 cm, and attached with Nichiban Tape (CT-24), and then proceeded with the peeling test. Peeling tests were performed twice on the same surface, and the adhesive strength was evaluated from 5B (not peeled) to 0B (front surface peeled) according to the peeled level (excellent up to 5B).

5B (not peeled)

4B (1 to 5 grids containing peeled parts)

3B (6 to 15 grids containing peeled parts)
2B (16 to 35 grids containing peeled parts)
1B (36 to 50 grids containing peeled parts)
0B (51 or more grids containing peeled parts)

Experimental Example 5: Evaluation of Scratch Resistance

For the hard coating layer formed on the front surface of each cover window of Examples and Comparative Examples, a load of 500 gf was applied to the steel wool (#0000), and the surface of the hard coating film was rubbed back and forth 500 times at a speed of 30 rpm, and it was observed whether scratches occurred on the surface. When one or less scratches of 1 cm or less observed with the naked eye were observed, it was judged to be excellent.

Experimental Example 6: Bending Durability Test

Figure 1:
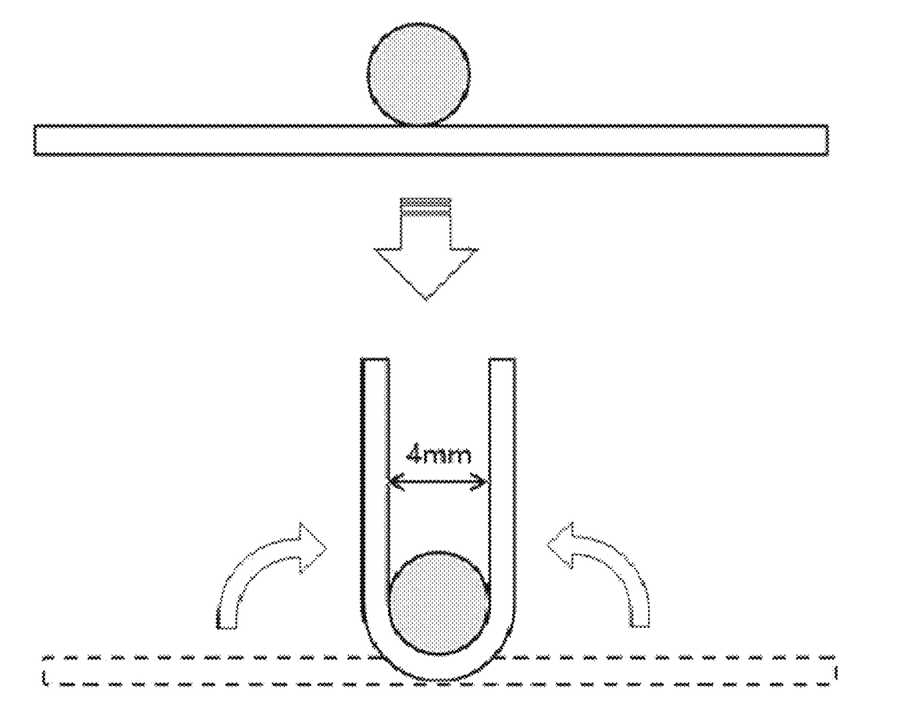
FIG. 1 is a view schematically showing a method for performing a bending durability test of Experimental Example 6.

FIG. 1 is a view schematically showing a method for performing a bending durability test of a film according to one embodiment of the present disclosure.

Each of the films of Examples and Comparative Examples was cut, but laser cutting was performed into a size of 80×140 mm so as to minimize fine cracks at the edge portions. The laser cut film was placed on the measuring equipment and set so that the interval between the folded portions was 4 mm. Then, processes of folding and spreading both sides of the films at 90 degrees toward the bottom surface at room temperature were repeated 100,000 times by continuous operations (the speed at which the film was folded was once every 1.5 seconds)

After repeating 100,000 times, the film was peeled off, and it was observed whether or not cracks of 3 mm or more in length occurred (OK, NG). When cracks did not occur, the film was again bended 100,000 times and whether or not cracks occurred was repeatedly observed, thereby measuring the maximum number of repetitions that cracks do not occur.

Experimental Example 7: Modulus Measurement (1) Measure the Modulus of the Cover Window for the Flexible Display Device The modulus of the film was measured according to ISO 527-3 using Universal Testing Systems (Instron® 3360). Each film of Examples and Comparative Examples was cut, but laser cutting was performed into a size of 10×150 mm so as to minimize fine cracks at the edge portions. The edge of the laser-cut film was fixed to the measuring equipment (Instron® 3360), and measurement was performed at a strain rate of 12.5 mm/min until the specimen was broken in the tensile direction.

(2) Measure the Modulus of the First Hard Coating Layer of the Cover Window for the Flexible Display Device The modulus of the first hard coating layer was measured according to ISO 14577-1 using a Nano Indentation System (MTS Nanoindenter XP). More specifically, measurement was performed at a strain rate of 0.05/s to a depth of 400 m by applying a load of 45 mN from the surface of the first hard coating layer using a 50 nm Berkovich Indenter Tip.

The measurement results of the physical properties for Examples and Comparative Examples are shown in Table 2 below.

TABLE 2

| | Example 1 | Example 2 | Example 3 | Example 4 | Comparative Example 1 | Comparative Example 2 | Comparative Example 3 | Comparative Example 4 |
|---|---|---|---|---|---|---|---|---|
| First hard coating layer (upper layer) | Preparation Example 1-1 | Preparation Example 1-2 | Preparation Example 1-3 | Preparation Example 1-3 | Preparation Example 1-4 | Preparation Example 1-5 | Preparation Example 1-3 | Preparation Example 1-3 |
| Second hard coating layer (lower layer) | Preparation Example 2-1 | Preparation Example 2-1 | Preparation Example 2-1 | Preparation Example 2-1 | Preparation Example 2-1 | Preparation Example 2-1 | Preparation Example 2-1 | Preparation Example 2-1 |
| Transmittance (%) | 91.9 | 91.8 | 91.9 | 92.2 | 92.1 | 92.0 | 92.2 | 92.0 |
| Haze (%) | 0.82 | 0.48 | 0.42 | 0.90 | 0.48 | 0.31 | 0.45 | 0.31 |
| Attaching the coating layer | OK | OK | OK | OK | OK | OK | OK | OK |
| Scratch resistance | Excellent | Excellent | Excellent | Excellent | Excellent | Excellent | Excellent | Excellent |
| First hard coating layer pencil hardness | 7 H | 7 H | 6 H | 8 H | 8 H | 4 H | 6 H | 6 H |
| Bending test | 4 mm | 4 mm | 3 mm | 5 mm | 8 mm | 4 mm | 6 mm | 8 mm |
| Bending durability (25° C., 5 mm) | 100,000 times Ok | 100,000 times Ok | 100,000 times Ok | 100,000 times Ok | NG | 100,000 times Ok | NG | NG |
| Elastic modulus of polyimide substrate (GPa) | 6.1 | 6.1 | 6.1 | 6.2 | 6.1 | 6.1 | 3.9 | 3.5 |
| Elastic modulus of cover window (GPa) (A) | 6.0 | 6.0 | 5.8 | 6.0 | 6.1 | 5.7 | 4.0 | 3.7 |
| Modulus of the first hard coating layer (GPa) (B) | 11.63 | 11.35 | 10.99 | 11.12 | 12.5 | 7.83 | 10.54 | 10.48 |

TABLE 2-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Modulus of the second hard coating layer (GPa) (C) | 9.62 | 9.73 | 9.42 | 9.83 | 10.25 | 9.47 | 9.48 | 9.36 |
| B/A | 1.938 | 1.892 | 1.895 | 1.853 | 2.049 | 1.374 | 2.635 | 2.832 |

As shown in Table 2, the cover window for a flexible display device of Examples exhibits high hardness while being implemented so as to satisfy sufficient flexibility at the same time while exhibiting a glass level of a high hardness, in particular, hardly have a risk of damaging the film even by repetitive bending or folding operations, and thus, can be easily applied to bendable, flexible, rollable or foldable mobile devices, display devices, and the like.

On the contrary, the cover windows of Comparative Examples did not have a relatively low surface hardness, unlike Examples, or did not exhibit bending durability enough to be used as a cover window for a flexible display device.

The invention claimed is:

1. A cover window for a flexible display device comprising a laminate including a substrate, a first hard coating layer and a second hard coating layer,
   wherein the substrate is a light-transmitting substrate or polymer substrate,
   wherein the first hard coating layer is formed on one surface of the substrate and the second hard coating layer is formed on a surface of the substrate opposite to the one surface,
   wherein a ratio of a modulus of the first hard coating layer to a total modulus of the laminate is 1.5 to 2.0,
   wherein a surface pencil hardness measured from the first hard coating layer side is at least 5H based on 750 g,
   wherein the total modulus of the laminate is measured by applying a strain rate of 12.5 mm/min according to ISO 527-3, and
   the modulus of the first hard coating layer is measured at a strain rate of 0.05/s by applying a target load of 45 mN according to ISO 14577-1 and applying a target depth of 400 μm from the first hard coating layer,
   wherein the first hard coating layer includes a binder resin containing a cured product of a monomer mixture including a 6- or less functional (meth)acrylate compound and a 8- or more functional (meth)acrylate compound, and fine inorganic particles dispersed in the binder resin,
   wherein a weight ratio of the 6- or less functional (meth)acrylate compound and the 8- or more functional (meth)acrylate compound is 1:3 to 1:9,
   wherein the ratio of the modulus of the first hard coating layer to the total modulus of the laminate is 0.223 to 0.338 higher than the ratio of the modulus of the second hard coating layer to the total modulus of the laminate, and
   wherein the light-transmitting substrate has an elastic modulus of at least 5 GPa as measured by applying a strain rate of 12.5 mm/min.

2. The cover window for a flexible display device according to claim 1, wherein
   the ratio of the modulus of the first hard coating layer to the total modulus of the laminate is 1.750 to 1.950.

3. The cover window for a flexible display device according to claim 1, wherein
   the total modulus of the laminate is 5.5 to 6.5 GPa, and the modulus of the first hard coating layer is 10.0 to 12.0 GPa.

4. The cover window for a flexible display device according to claim 3, wherein
   the light-transmitting substrate has a thickness of 5 to 100 μm, , and
   each of the first and second hard coating layers has a thickness of 1 to 20 μm..

5. The cover window for a flexible display device according to claim 1, wherein
   the light-transmitting substrate has a thickness of 5 to 100 μm, , and
   each of the first and second hard coating layers has a thickness of 1 to 20 μm..

6. The cover window for a flexible display device according to claim 1, wherein
   the light-transmitting substrate includes at least one polymer selected from polyimide, polyamide, and polyamideimide.

7. The cover window for a flexible display device according to claim 1, wherein
   cracks do not occur in a 100,000-time bending durability test conducted around a rod having a diameter of 2 mm at a temperature of 25° C.

8. The cover window for a flexible display device according to claim 1, wherein
   the cover window has a transmittance of at least 90.0% with respect to light in a wavelength range of 550 nm, and a haze value of 1.00% or less.

9. The cover window for a flexible display device according to claim 1, wherein
   the second hard coating layer includes a binder resin derived from a (meth)acrylate compound and fine inorganic particles dispersed in the binder resin, and
   a ratio of a modulus of the second hard coating layer to the total modulus of the laminate is 1.400 to 1.800.

10. The cover window for a flexible display device according to claim 1, wherein
    the binder resin contained in the first hard coating layer further includes a copolymer formed from (meth)acrylic polymer having a weight average molecular weight of 10,000 to 200,000, and a monomer mixture.

11. The cover window for a flexible display device according to claim 1, wherein
    the first hard coating layer contains 50 to 80 parts by weight of the fine inorganic particles relative to 100 parts by weight of the binder resin, and
    the second hard coating layer contains 50 to 80 parts by weight of the fine inorganic particles relative to 100 parts by weight of the binder resin.

12. A flexible display device comprising the cover window for a flexible display device according to claim 1.

* * * * *